(12) United States Patent
Erikawa

(10) Patent No.: US 6,237,468 B1
(45) Date of Patent: May 29, 2001

(54) VAPOR-EXHAUSTING MECHANISM OF DRINK SUPPLY APPLIANCE

(75) Inventor: Hajime Erikawa, Saitama-Ken (JP)

(73) Assignee: Sanyo Electric Co., Ltd., Osaka-Fu (JP)

( * ) Notice: Subject to any disclaimer, the term of this patent is extended or adjusted under 35 U.S.C. 154(b) by 0 days.

(21) Appl. No.: 09/404,152

(22) Filed: Sep. 27, 1999

(51) Int. Cl.[7] ........................................ A47J 31/00
(52) U.S. Cl. ........................... 99/287; 99/289 R; 99/290; 99/323.3; 222/129.3; 222/129.4; 366/139
(58) Field of Search ................................ 99/275, 279, 286, 99/287, 289 R, 304, 323.3, 290; 222/129, 129.3, 129.4, 135; 366/139

(56) References Cited

U.S. PATENT DOCUMENTS 5,192,002 * 3/1993 Reese et al. ..................... 222/108
5,344,050 * 9/1994 Ficken ............................. 222/129.4
5,839,610 11/1998 Reese et al. .................... 222/129.3

FOREIGN PATENT DOCUMENTS 0 316 169 A1    5/1989 (EP).

* cited by examiner

*Primary Examiner*—Gabrielle Brouillette
*Assistant Examiner*—Robert Madsen
(74) *Attorney, Agent, or Firm*—McDermott, Will & Emery

(57) ABSTRACT

Vapor evaporated from plural mixing bowls are absorbed and exhausted by a box shaped vapor-exhausting chamber. The vapor-exhausting chamber is composed of an upper casing, a lower casing, and a panel provided with plural through-holes inserted between the upper and lower casings. The panel equalizes negative pressure applied to the plural mixing bowls, and functions as a filter for separating powdery material from vapor by making powdery material adhere to the panel. The powdery material-accumulated panel can be removed by disassembling the vapor-exhausting chamber, and cleaned up.

8 Claims, 5 Drawing Sheets

VAPOR-EXHAUSTING MECHANISM OF DRINK SUPPLY APPLIANCE

FIELD OF THE INVENTION

The invention relates to a vapor-exhausting mechanism of a drink supply appliance, and especially to a vapor-exhausting mechanism of a drink supply appliance which prevents a deterioration of a vapor-exhausting capability thereof caused by adhesion of powdery material attendant upon absorption of vapor.

BACKGROUND OF THE INVENTION

Hitherto, a drink supply appliance which mixes powdery or granular material with hot or cold water and supplies a mixed drink to a cup is known.

A drink supply appliance is provided with a mixing bowl for mixing powdery or granular material with hot or cold water. The mixing bowl mixes powdery material supplied from a material storage container via a powdery material shoot in accordance with a selected drink with hot or cold water supplied from a hot or cold water supply unit using a mixing blade connected with a motor, and supplies a mixed drink to a cup.

A conventional drink supply appliance partially shown in FIG. 1 comprises a powdery material storage section 1 for storing powdery material suited for drinks of various kinds, a powdery material supply section 2 for supplying powdery material stored in the powdery material storage section 1, a rotational axis 3 for driving a powdery material-extruding mechanism (not shown) provided for the powdery material supply section 2, a reduction gear 4 for reducing a rotational speed of a rotational speed to be transmitted to the rotational axis 3 with a predetermined reduction ratio, a supporting plate 5 for fixing the reduction gear 4, a motor 6 for generating the rotational power to be transmitted to the rotational axis 3, and a mixing bowl assembly 9 for mixing powdery material supplied from the powdery material supply section 2 via a powdery material shoot assembly 8 with hot or cold water.

The powdery material storage section 1 is divided into storage containers 1A, 1B, 1C, 1D, 1E, 1F, and 1G. The powdery material supply section 2 is provided with powdery material supply outlets 2A, 2B, 2C, 2D, 2E, 2F, and 2G for respectively supplying powdery material supplied from the storage containers 1A, 1B, 1C, 1D, 1E, 1F, and 1G. The powdery material shoot assembly 8 situated under the powdery material supply section 2 is provided with shoots 8A, 8B, 8C, 8D and 8E for receiving powdery material supplied from the powdery material supply section 2. The shoots 8A, 8B, 8C, and 8D respectively receive powdery material supplied from the powdery material supply outlets 2A, 2B, 2C, and 2D, and the shoot E receives powdery material supplied from the powdery material supply outlets 2E, 2F, and 2G. Moreover, the shoots 8A, 8B, 8C, 8D, and 8E are respectively supported in accordance with the insertion of fitting pieces 8a into openings 5A by the supporting plate 5. A mixing bowl assembly 9 mixes powdery material supplied to mixing bowls 9A, 9B, 9C, 9D, and 9E via the shoots 8A, 8B, 8C, 8D, and 8E with hot or cold water, and supplies mixed drinks to cups via drink supply pipes 9a. Powdery material and hot or cold water are mixed in the mixing bowls 9A, 9B, 9C, 9D and 9E by means of mixing motors 10A, 10B, 10C, 10D, and 10E respectively fixed to bases 10a. Although only the mixing motor 10E provided for the mixing bowl 9E is shown in FIG. 1, the other mixing bowls 9A, 9B, 9C, and 9D are respectively provided with the other mixing motors similarly to the case of the mixing bowl 9E.

A vapor-exhausting mechanism of the mixing bowl assembly 9 is shown in FIG. 2, and comprises hose-joining portions 9b respectively situated behind the mixing bowls 9B, 9C, 9D, and 9E, motor-fixing members 10b for respectively fixing the mixing motors 10B, 10C, 10D, and 10E to predetermined portions of the mixing bowls 9B, 9C, 9D and 9E, hoses 11B, 11C, 11D and 11E jointed to the hose-joining portions 9b of the respective fixing bowls, and an exhaust fan unit 12 having the hose-joining portions 12B, 12C, 12D and 12E for respectively joining the hoses 11B, 11C, 11D and 11E to the exhaust fan unit 12. The exhaust fan unit 12 absorbs vapor evaporated from the mixing bowls 9B, 9C, 9D, and 9E by a rotation of a built-in fan (not shown) through the hoses 11B, 11C, 11D, and 11E, and exhausts vapor to the outside of the drink supply appliance. Although a mixing bowl 9A is omitted in FIG. 2, the mixing bowl 9A is connected with the exhaust fan unit 12 by a hose 11A (not shown) also similarly to the other mixing bowls.

According to the aforementioned structure, since vapor evaporated from the mixing bowl section 9 at the time of mixing powdery material with hot water is exhausted not to make the powdery material shoot assembly 8 damp, a situation that the powdery material shoot assembly 8 is bunged by adhesion of powdery material can be prevented.

However, according to the conventional vapor-exhausting mechanism of the drink supply appliance, since powdery material is sometimes exhausted together with vapor when vapor is exhausted from the mixing bowl assembly, in the mixing bowl assembly of the drink supply appliance which frequently repeats operation for sale, it sometimes occurs that vapor-exhausting capability deteriorates because of adhesion of powdery material to a vapor-exhausting path, the vapor-exhausting path is bunged by deposit of powdery material, and the exhaust of vapor is stopped. Moreover, since the drink supply appliance having the plural mixing bowls is provided with the plural hoses serving as the vapor-exhausting paths, the drink supply appliance is large-sized and magnified.

SUMMARY OF THE INVENTION

Accordingly, it is an object of the invention to provide a vapor-exhausting mechanism of a drink supply appliance in which deterioration of vapor-exhausting capability caused by adhesion of powdery material does not occur, and a vapor-exhausting path is not bunged and can be made small sized.

According to the feature of the invention, a vapor-exhausting mechanism of a drink supply appliance comprises:

plural mixers for mixing powdery material with hot or cold water, means for generating negative pressure, the negative pressure absorbing and exhausting vapor evaporated from the plural mixers, a negative pressure chamber which is situated between the plural mixers and the means for generating the negative pressure and maintains a negative pressure condition caused by the means for generating the negative pressure therein, and a panel which is provided with plural through-holes, situated in an inside of the negative pressure chamber, and uniformly applies the negative pressure to the plural mixers.

In the aforementioned vapor-exhausting mechanism of the drink supply appliance, it is desirable that the negative pressure chamber is connected with the plural mixers and formed of separable casings so that the inside thereof is accessible. Moreover, it is desirable that the panel provided with the plural through-holes is fitted to one of the casings so that clearances are formed between one of the casings and both side ends of the panel, and the clearances function as bypasses for vapor in case that the through-holes are bunged by deposit of powdery material.

BRIEF DESCRIPTION OF THE DRAWINGS

The invention will be explained in more detail in conjunction with appended drawings, wherein.

DESCRIPTION OF THE PREFERRED EMBODIMENT

Thereafter, a vapor-exhausting mechanism of a drink supply appliance according to a preferred embodiment of the invention will be explained referring to the appended drawings.

Figure 1:
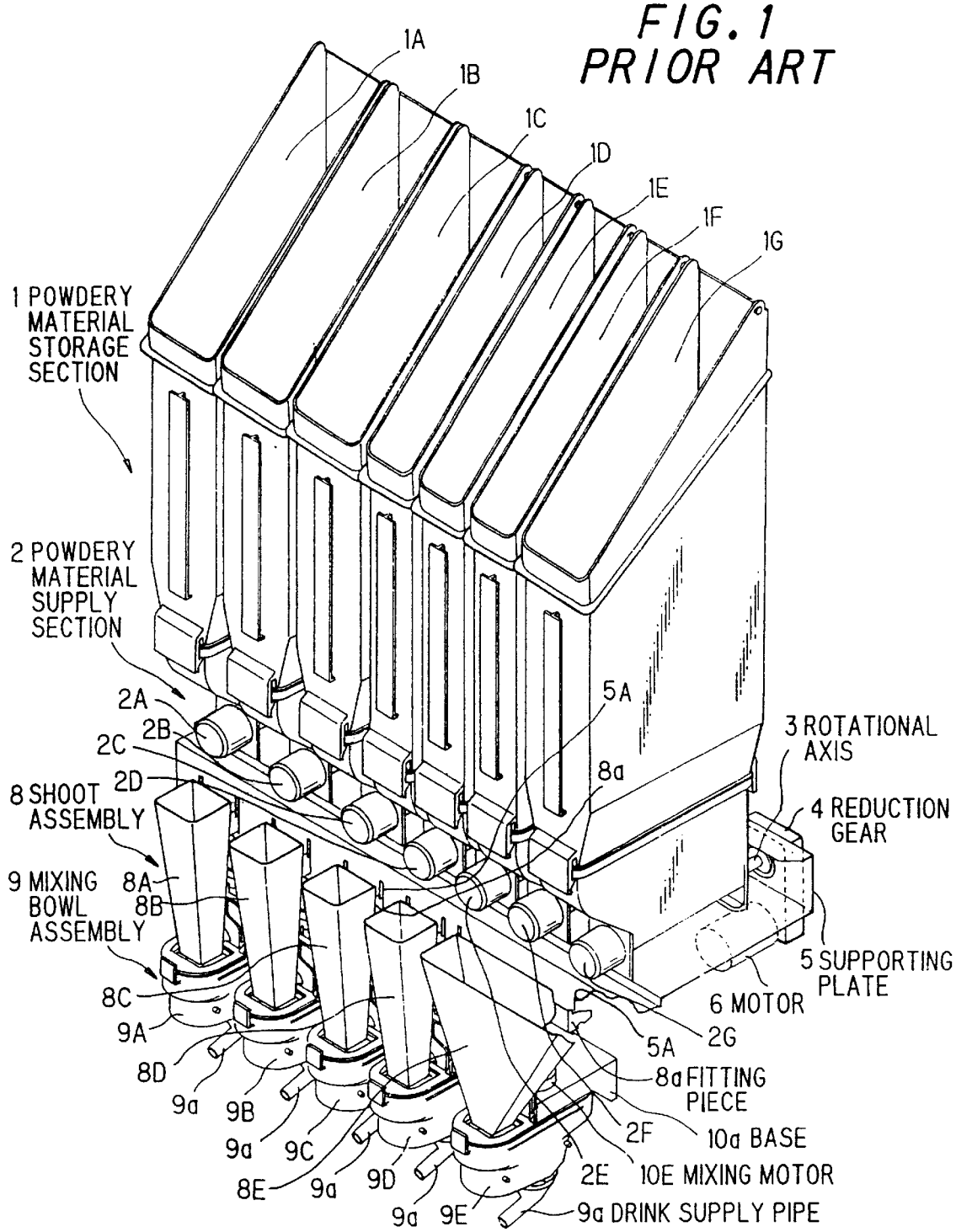
FIG. 1 shows a perspective view for showing a conventional drink supply appliance, FIG. 2 partially shows a vapor-exhausting mechanism of a conventional drink supply appliance.
Figure 2:
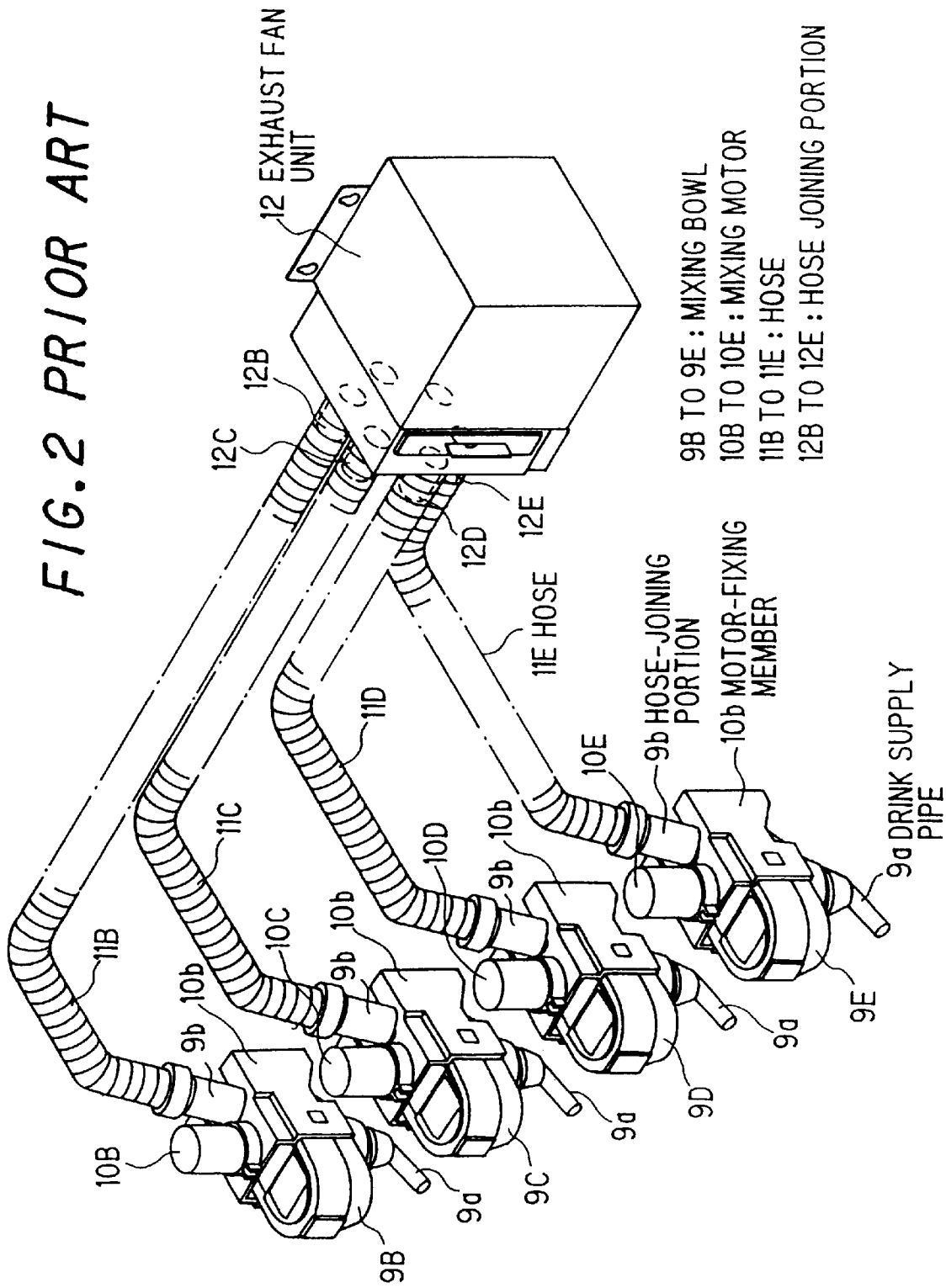
Figure 3:
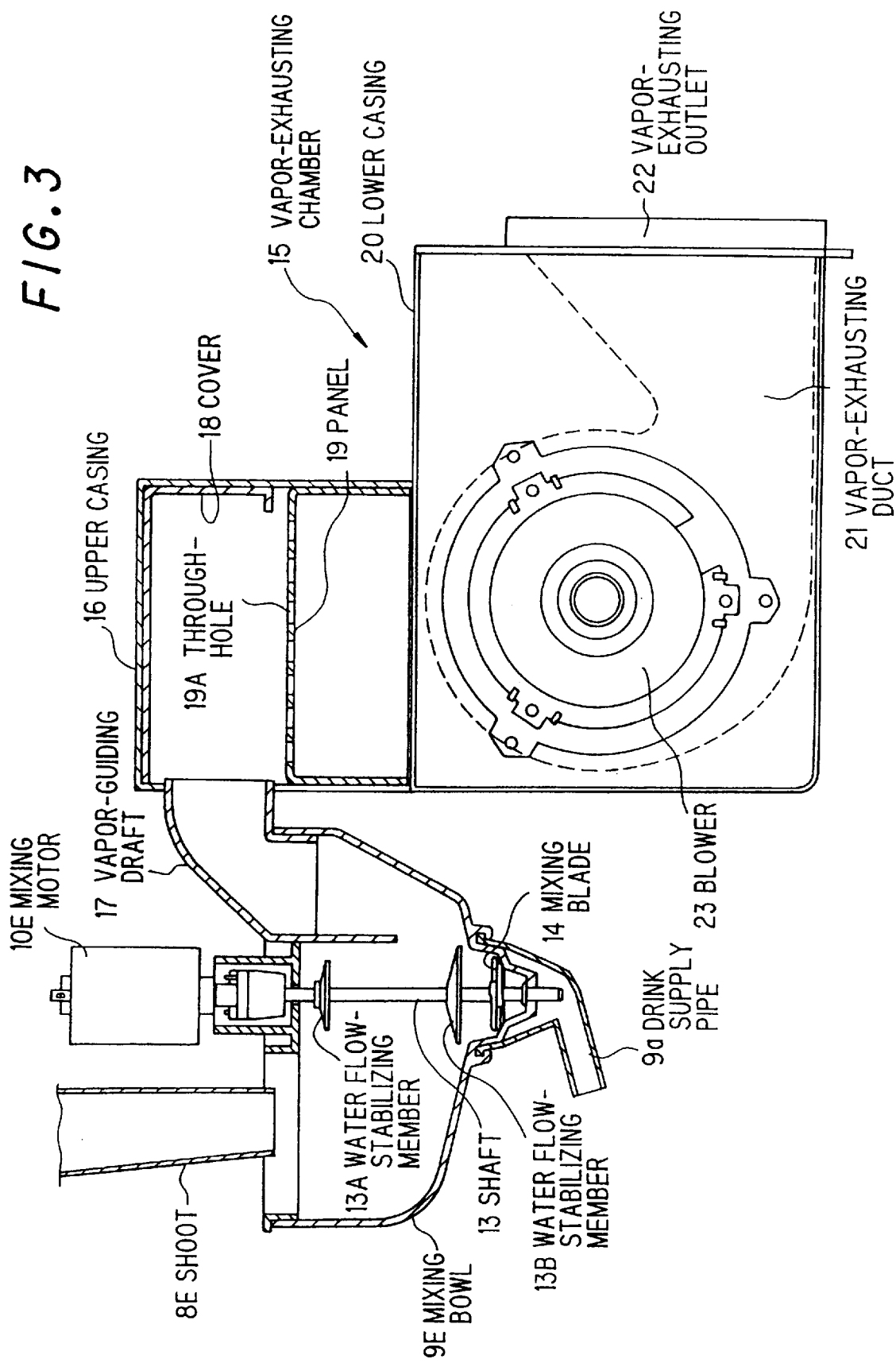
FIG. 3 is a cross-sectional view of a vapor-exhausting mechanism of a drink supply appliance according to a preferred embodiment of the invention.

FIG. 3 partially shows a vapor-exhausting mechanism of a drink supply appliance according to a preferred embodiment of the invention. The vapor-exhausting mechanism of the drink supply appliance comprises a shaft 13 which is connected with a mixing motor 10E and situated in the Inside of the mixing bowl 9E, a water flow-stabilizing member 13A fixed to an upper part of the shaft 13, a water flow-stabilizing member 13B which is situated at a lower part of the mixing bowl 9E and fixed to the shaft 13, a mixing blade 14 fixed to the shaft 13, and a vapor-exhausting chamber 15 which exhausts vapor from the mixing bowl 9E. The other mixing bowls which are other than the mixing bowl 9E and not shown in FIG. 3 have the same structures as that of the mixing bowl 9E.

The water flow-stabilizing member 13A stabilizes a flow of hot water near a surface thereof in case that the mixing bowl 9E is filled with hot water, which is mixed by the mixing blade 14 and washes the inside of the mixing bowl 9E. The water flow-stabilizing member 13B prevents hot water from being lowered in its surface level in case that powdery material supplied to the mixing bowl 9E is mixed with hot water.

The vapor-exhausting chamber 15 comprises an upper casing 16 provided with plural open areas (will be mentioned afterward) for absorbing in vapor from the mixing bowl 9E, a vapor-guiding draft 17 for guiding vapor into the mixing bowl 9E into the upper casing 16, a cover 18 which is provided on an inside wall of the upper casing 16 so that it can be fitted to and removed from the upper casing 16, a panel 19 which is situated in the inside of the upper casing 16 and can be fitted to and removed from the upper casing 16, plural through-holes 19A which are uniformly provided on the whole surface of the panel 19, a lower casing 20 which can be divided from the upper casing 16, a vapor-exhausting duct 21 formed in the lower casing 20, a vapor-exhausting outlet 22 for exhausting vapor from the lower casing 20 via a vapor-exhausting duct 21, and a blower 23 for absorbing vapor by rotating a fan (not shown).

The cover 18 is fitted to the upper casing 16 so that it covers an upper inside wall and a rear inside wall of the upper casing 16, and can be fitted to or removed from the upper casing 16 when the upper and lower casings 16 and 20 are disassembled, hence powdery material adhered to the cover 18 can be easily removed.

Figure 4:
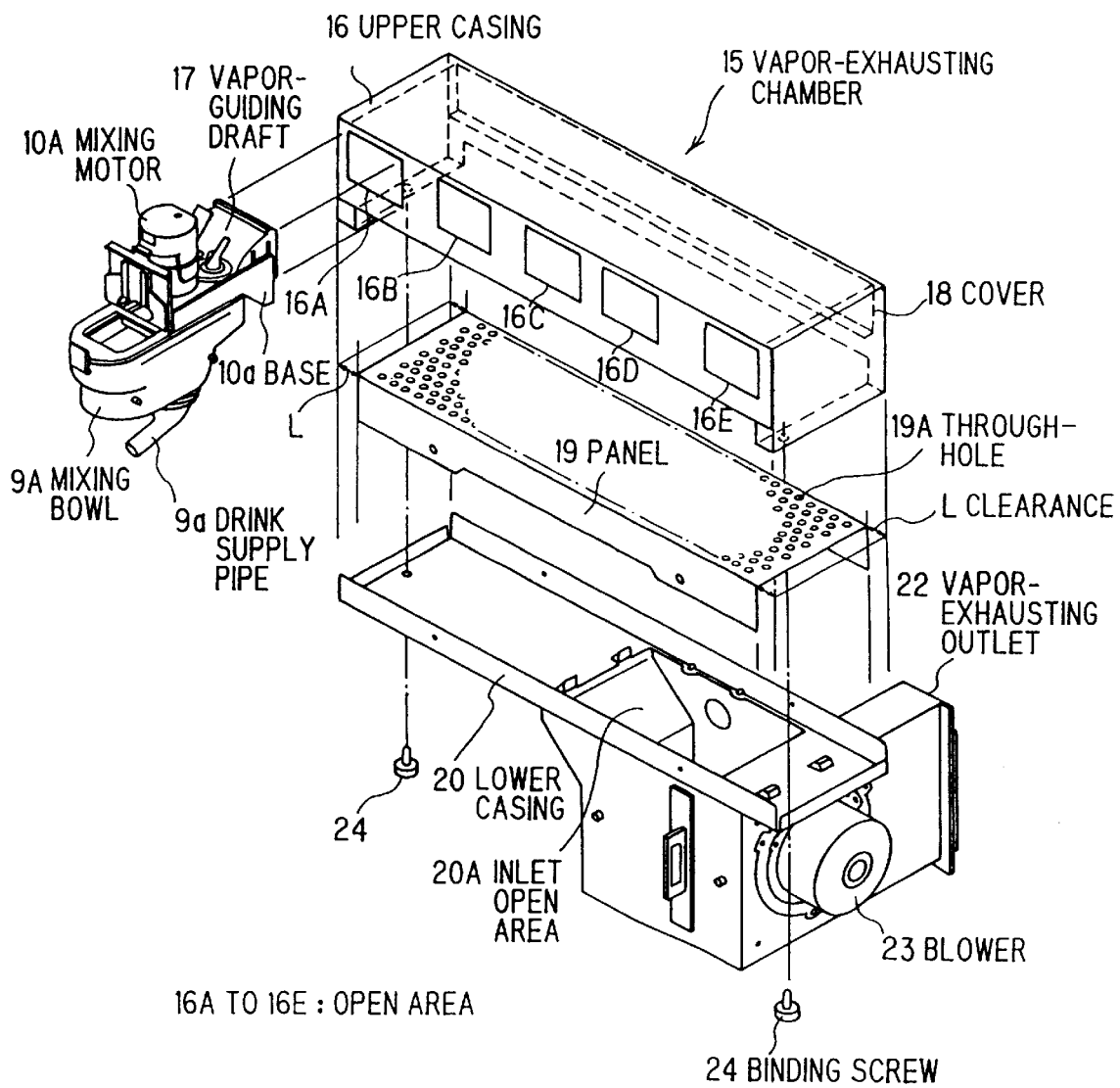
FIG. 4 is an exploded view of a vapor-exhausting mechanism of a drink supply appliance according to a preferred embodiment of the invention.

FIG. 4 shows an exploded view of the vapor-exhausting mechanism of the drink supply appliance shown in FIG. 3. When the blower rotates, negative pressure is generated in the lower casing 20, and vapor in the upper casing 16 is absorbed into the lower casing 20 via the through-holes 19A arranged on the panel 19, which generates a pressure loss thereacross determined by a diameter, the number and a state of an arrangement of the through-holes 19A. The aforementioned pressure loss equalizes amounts of absorption of vapor from the mixing bowls 9A, 9B, 9C, 9D and 9E. Moreover, since vapor is absorbed into the lower casing 20 via the through-holes 19A, the panel 19 functions as a filter for obstructing passage of powdery material.

A longer side of the panel 19 is shorter than that of the upper casing 16. Accordingly, when the upper casing 16, the panel 19 and the lower casing 20 are assembled into the vapor-exhausting chamber 15 in condition that the panel 19 is inserted between the upper and lower casings 16 and 20, clearances L are formed at both side ends of the panel 19. The clearances L function as bypasses for vapor in case that the through-holes 19A are bunged by deposit of powdery material, and vapor passing through the clearances L is guided to an inlet open area 20A of the vapor-exhausting duct 21 in the lower casing 20.

The upper and lower casings 16 and 20 are combined with each other by binding screws 24, and can be separated from each other in cases of cleaning, inspection and etc. by removing the binding screws 24.

Figure 5:
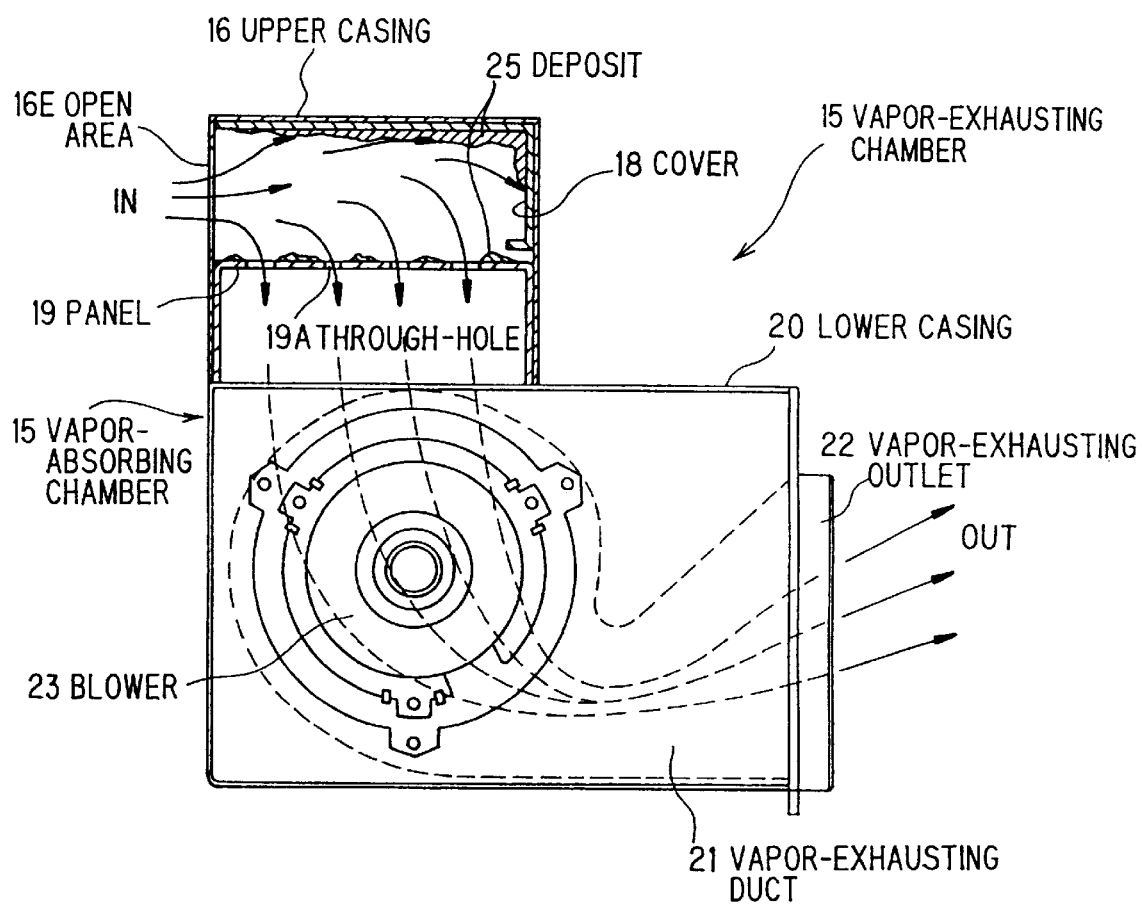
FIG. 5 is a cross-sectional view of a vapor-exhausting mechanism of a drink supply appliance according to a preferred embodiment of the invention.

Thereafter, the operation of the vapor-exhausting mechanism of the drink supply appliance according to the invention will be explained referring to FIG. 5. In FIG. 5, flow of vapor absorbed from the mixing bowl 9E is shown.

FIG. 5 shows flow of vapor caused by the rotation of the blower 23. If negative pressure is generated by the rotation of the blower 23, vapor is absorbed into the upper casing 16 through an open area 16E. Then, vapor flows to the vapor-exhausting duct 21 via the through-holes 19 formed on the panel 19. The through-holes 19A generate a pressure loss thereacross dependently on a diameter, the number, the arrangement, etc. thereof to thereby absorb vapor through the open areas 16A, 16B, 16C, 16D, and 16E with an equal amount. Vapor drawn to the vapor-exhausting duct 21 is exhausted from a vapor-exhausting outlet 22.

In case that the through-holes 19A are bunged up by deposit of powdery material which is absorbed together with vapor, vapor passes through the clearances L formed between the panel 19 and the upper casing 16.

In case that the through-holes 19A of the panel 19 is bunged, the upper and lower casings 16 and 20 are separated from each other, and the panel 19 is removed. Then, the panel 19 is cleaned or exchanged with a new one. Moreover, in the upper casing 16, since powdery material adheres to the upper inside wall and the rear inside wall of the cover 18, the cover 18 is removed to be cleaned similarly to the case of the panel 19, and cleaned up.

According to the aforementioned vapor-exhausting mechanism of the drink supply appliance, since vapor is absorbed through the box shaped vapor-exhausting chamber 15 which is composed of the upper and lower casings 16 and 20, a cross-sectional area of the vapor-exhausting path can be made large, and deterioration of the efficiency in vapor absorption caused by deposit of powdery material which is absorbed from the mixing bowls together with vapor is suppressed. The panel 19 situated in the inside of the vapor-exhausting chamber 15 equalizes absorption amounts of vapor from the respective mixing bowls by generating predetermined pressure loss thereacross by means of the plural through-holes 19A uniformly formed on the whole surface of the panel 19, and functions as a filter for separating powdery material from vapor by adhering powdery material absorbed together with vapor to the panel 19. The dirty panel 19 is removed to be cleaned by separating the upper and lower casings 16 and 20 from each other.

Moreover, since vapor-exhausting chamber 15 can be set close to the mixing bowls, the lengths of the vapor-exhausting paths can be reduced, and actual handling for connecting the vapor-exhausting chamber with the mixing bowls can be simplified.

Although the through-holes are uniformly formed on the whole surface of the panel in the aforementioned embodiment, the diameter, the number and the arrangement of the through-holes can be changed in accordance with the number of the mixing bowls and the exhausting capability of the blower.

As mentioned in the above, since a vapor-exhausting mechanism of a drink supply appliance according to the invention comprises plural mixers for mixing powdery material with hot water, negative pressure generator which absorbs and exhausts evaporated vapor from the plural mixers, a negative pressure chamber which is situated between the plural mixers and means for generating negative pressure which absorbs and exhausts the evaporated vapor from the plural mixers, and a panel which is provided with plural through-holes, situated in the inside of the negative pressure chamber and uniformly applies negative pressure to the plural mixers, so that deposit of powdery material can be prevented, vapor-exhausting capability does not deteriorates, the through-holes are not bunged, and a vapor-exhausting path can be made compact.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A vapor-exhausting mechanism of a drink supply appliance, comprising:
   plural mixers for mixing powdery material with hot or cold water,
   means for generating negative pressure, said negative pressure absorbing and exhausting vapor evaporated from said plural mixers,
   a negative pressure chamber which is situated between said plural mixers and said means for generating said negative pressure and maintains a negative pressure condition caused by said means for generating said negative pressure therein, and
   a panel which is provided with plural through-holes, situated in an inside of said negative pressure chamber, and uniformly applies said negative pressure to said plural mixers.

2. A vapor-exhausting mechanism of a drink supply appliance, according to claim 1, wherein:
   said negative pressure chamber is connected with said plural mixers, and formed of separable casings so that said inside of said negative pressure chamber is accessible.

3. A vapor-exhausting mechanism of a drink supply appliance, according to claim 2, wherein:
   said panel is fitted to one of said casings so that clearances are formed between said one of casings and both side ends of said panel,
   wherein said clearances function as bypasses for said vapor in case said through-holes are bunged by deposit of said powdery material.

4. The vapor-exhausting mechanism of a drink supply appliance according to claim 2, wherein the separable casings comprise an upper casing and a lower casing, and a cover is removably fitted into the upper casing.

5. The vapor-exhausting mechanism of a drink supply appliance according to claim 4, wherein the cover covers an upper inside wall and rear inside wall of the upper casing.

6. A vapor-exhausting mechanism of a drink supply appliance, comprising:
   plural mixers for mixing powdery material with hot or cold water, said plural mixers being arranged in a row of a predetermined length; and
   a vapor-exhausting chamber for applying negative pressure via plural vapor-guiding drafts to said plural mixers to exhaust vapor generated in said plural mixers, said plural vapor-guiding drafts are connected via plural open areas to said vapor-exhausting chamber, said plural vapor-guiding drafts and said plural open areas being equal in number to said plural mixers and arranged in rows of said predetermined length.

7. A vapor-exhausting mechanism of a drink supply appliance, according to claim 6, wherein:
   said vapor-exhausting chamber, comprises:
   a blower for generating said negative pressure; and
   a panel apertured with a number of through-holes to apply approximately equal negative pressures to said plural mixers in accordance with said negative pressure generated by said blower, said panel being positioned between said vapor-guiding drafts and said blower.

8. A drink supply appliance, comprising:
   plural powdery material storage sections for storing powdery material;
   plural a powdery material supply mechanisms for supplying powdery material from the storage section,
   plural mixers for mixing powdery material with hot or cold water;
   means for generating negative pressure, said negative pressure absorbing and exhausting vapor evaporated from said plural mixers;
   a negative pressure chamber which is situated between said plural mixers and said means for generating said negative pressure and maintains a negative pressure condition caused by said means for generating said negative pressure therein, and
   a panel which is provided with plural through-holes, situated inside of said negative pressure chamber, and uniformly applies said negative pressure to said plural mixers.

* * * * *